United States Patent
Wang et al.

(10) Patent No.: US 11,059,043 B2
(45) Date of Patent: Jul. 13, 2021

(54) IMPEDANCE BASED FEEDBACK CONTROL OF MICROFLUIDIC VALVES

(71) Applicants: The Johns Hopkins University, Baltimore, MD (US); Pioneer Hi-Bred International, Inc., Johnston, IA (US)

(72) Inventors: Tza-Huei Wang, Timonium, MD (US); Brant Axt, Baltimore, MD (US); Yi-Fan Hsieh, Baltimore, MD (US); Helena C. Zec, Baltimore, MD (US); Aniruddha Kaushik, Baltimore, MD (US); Kuangwen Hsieh, Germantown, MD (US); Yue Yun, Johnston, IA (US)

(73) Assignees: The Johns Hopkins University, Baltimore, MD (US); Pioneer Hi-Bred International, Inc., Johnston, IA (US)

( * ) Notice: Subject to any disclaimer, the term of this patent is extended or adjusted under 35 U.S.C. 154(b) by 491 days.

(21) Appl. No.: 15/491,743

(22) Filed: Apr. 19, 2017

(65) Prior Publication Data
US 2018/0304267 A1     Oct. 25, 2018

(51) Int. Cl.
*B01L 3/00*     (2006.01)
*F16K 99/00*     (2006.01)

(52) U.S. Cl.
CPC ... *B01L 3/502784* (2013.01); *B01L 3/502738* (2013.01); *B01L 2200/061* (2013.01);
(Continued)

(58) Field of Classification Search
CPC ......... B01L 3/502784; B01L 3/502738; B01L 2200/061; B01L 2200/143;
(Continued)

(56) References Cited

U.S. PATENT DOCUMENTS

2014/0190830 A1*   7/2014   Sturmer ............... G01N 27/048
                                                                              204/452
2016/0298173 A1   10/2016   Wang et al.

FOREIGN PATENT DOCUMENTS

WO    WO-2015112985 A1 *   7/2015   ........ B01L 3/502784

OTHER PUBLICATIONS

Niu, Xize, et al. "Real-time detection, control, and sorting of microfluidic droplets." Biomicrofluidics 1.4 (2007): 044101.*
(Continued)

*Primary Examiner* — Robert J Eom
(74) *Attorney, Agent, or Firm* — Venable LLP; Henry J. Daley

(57) ABSTRACT

A microfluidic system includes a microfluidic chip including a channel layer and a fluid control layer operatively connected to the channel layer, the channel layer having one or more fluid channels. The one or more channels are configured to contain a plurality of droplets. A valve control system is provided to control flow of fluid through the one or more fluid channels in the channel layer. The microfluidic system also includes a droplet impedance detection and feedback control system operatively connected to the valve control system. The droplet impedance detection and feedback control system is configured to detect at least a position of at least one droplet in a fluid channel and to send a signal to the valve control system to operate a particular valve at a particular time based on the detected position of the at least one droplet.

12 Claims, 16 Drawing Sheets

(52) U.S. Cl.
CPC . *B01L 2200/143* (2013.01); *B01L 2300/0645* (2013.01); *B01L 2300/0883* (2013.01); *B01L 2400/022* (2013.01); *B01L 2400/0487* (2013.01); *B01L 2400/06* (2013.01); *F16K 2099/0084* (2013.01)

(58) Field of Classification Search
CPC ..... B01L 2300/0645; B01L 2300/0883; B01L 2400/022; B01L 2400/0487; B01L 2400/06; F16K 2099/0084
See application file for complete search history.

(56) References Cited

OTHER PUBLICATIONS

Shih, Steve CC, et al. "A feedback control system for high-fidelity digital microfluidics." Lab on a Chip 11.3 (2011): 535-540.*
Zec H., "Microfluidic platform for on-demand generation of spatially indexed combinatorial droplets," Lab Chip, 12, pp. 3055-3062 (2012). [Cited in the Specification].

* cited by examiner

IMPEDANCE BASED FEEDBACK CONTROL OF MICROFLUIDIC VALVES

STATEMENT OF GOVERNMENT INTEREST

This invention was made with Government support under Grant No. R01AI117032 awarded by the National Institutes of Health (NIH). The U.S. Government has certain rights in the invention.

CROSS-REFERENCE TO RELATED APPLICATIONS

This application claims priority benefit from U.S. Provisional Patent Application No. 62/324,705 filed on Apr. 19, 2016, the entire content of which is incorporated herein by reference. All references cited anywhere in this specification, including the Background and Detailed Description sections, are incorporated by reference as if each had been individually incorporated.

BACKGROUND

1. Technical Field

The field of the currently claimed embodiments of this invention relates to microfluidic systems, and more particularly microfluidic systems having feedback valve control.

2. Discussion of Related Art

Droplet microfluidics is a technology that creates small droplets within fluid channels mostly for the purpose of biological assays. Each droplet acts as a reaction chamber as the droplet travels through the device. Sometimes assays require injection steps in order to place a reagent in the droplet at the right time. A robust method of injection used in microfluidic devices is microfluidic valves, which are actuated by pressure controllers. In current literature, these valves rely on open loop control or on manual control of the valve by a user. Varied droplet travel time makes open loop control unreliable and long running experiments make manual user control unfeasible. Therefore, there remains a need for improved microfluidic systems having feedback valve control.

SUMMARY OF THE DISCLOSURE

An aspect of the present disclosure is to provide a microfluidic system having feedback valve control. The microfluidic system includes a microfluidic chip including a channel layer and a fluid control layer operatively connected to the channel layer, the channel layer having one or more fluid channels and one or more fluid input ports connected to the one or more fluid channels. The microfluidic system further includes a fluid input system fluidly connected to the one or more fluid input ports of the channel layer, the fluid input system being configured to input at least a sample solution, buffer solution and at least one reagent. The one or more channels are configured to contain a plurality of droplets, the plurality of droplets including at least the sample solution and separated from each other by the buffer solution. The microfluidic system also includes a valve control system operatively connected to the fluid control layer to selectively open and close a plurality of valves in the channel layer to control flow of fluid through the one or more fluid channels in the channel layer. The microfluidic system further includes a droplet detection and feedback control system operatively connected to the valve control system and comprising an impedance-based droplet detection system. The droplet detection and feedback control system is configured to detect at least a position of at least one droplet in a fluid channel in the one or more fluid channels and to send a signal to the valve control system to operate a particular valve in the plurality of valves at a particular time based on the detected at least position of the at least one droplet.

Another aspect of the present disclosure is to provide a microfluidic system having feedback valve control. The microfluidic system includes a fluid channel having a first input port configured to introduce a sample solution in a form of a plurality of droplets and a buffer solution separating the plurality of droplets, and a second input port configured to introduce a reagent into the fluid channel to mix with one or more droplets in the plurality of droplets of the sample solution. The microfluidic system further includes a valve control system connected to the second input port, the valve control system being configured to operate a valve to control a flow of the reagent. The microfluidic system also includes a droplet detection and feedback control system comprising an impedance-based droplet detection system, the droplet detection and feedback control system being operatively connected to the valve control system. The droplet detection and feedback control system is configured to detect at least a position of the one or more droplets of the sample solution in the fluid channel and to send a signal to the valve control system to operate the valve at a particular time based on the detected at least position of the one or more droplets so as to mix the reagent with the one or more droplets of the sample solution.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. In particular, the previously filed U.S. patent application Ser. No. 15/097,904, filed on Apr. 13, 2016, and published as US Patent Application Publication No. 2016/0298173 on Oct. 13, 2016 provides various examples of microfluidic systems, the entire content of which is hereby incorporated by reference.

Figure 1:
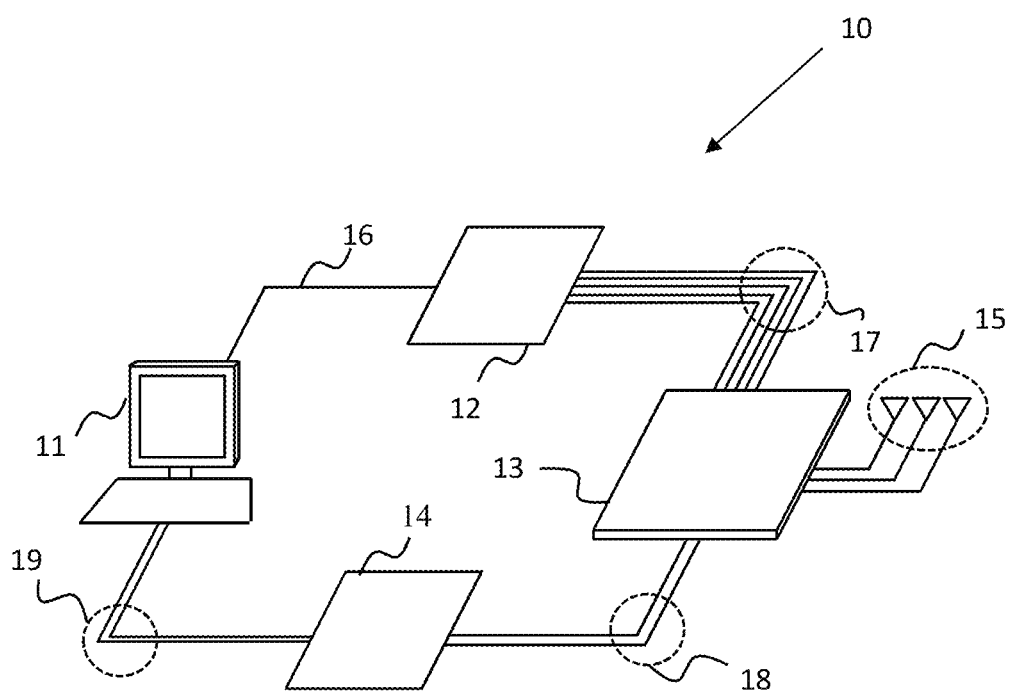
FIG. 1 is a schematic diagram of a microfluidic system having feedback valve control, according to an embodiment of the present disclosure.

FIG. 1 is a schematic diagram of a microfluidic system having feedback valve control, according to an embodiment of the present disclosure. As shown in FIG. 1, the microfluidic system 10 includes a microfluidic chip 13.

Figure 2:
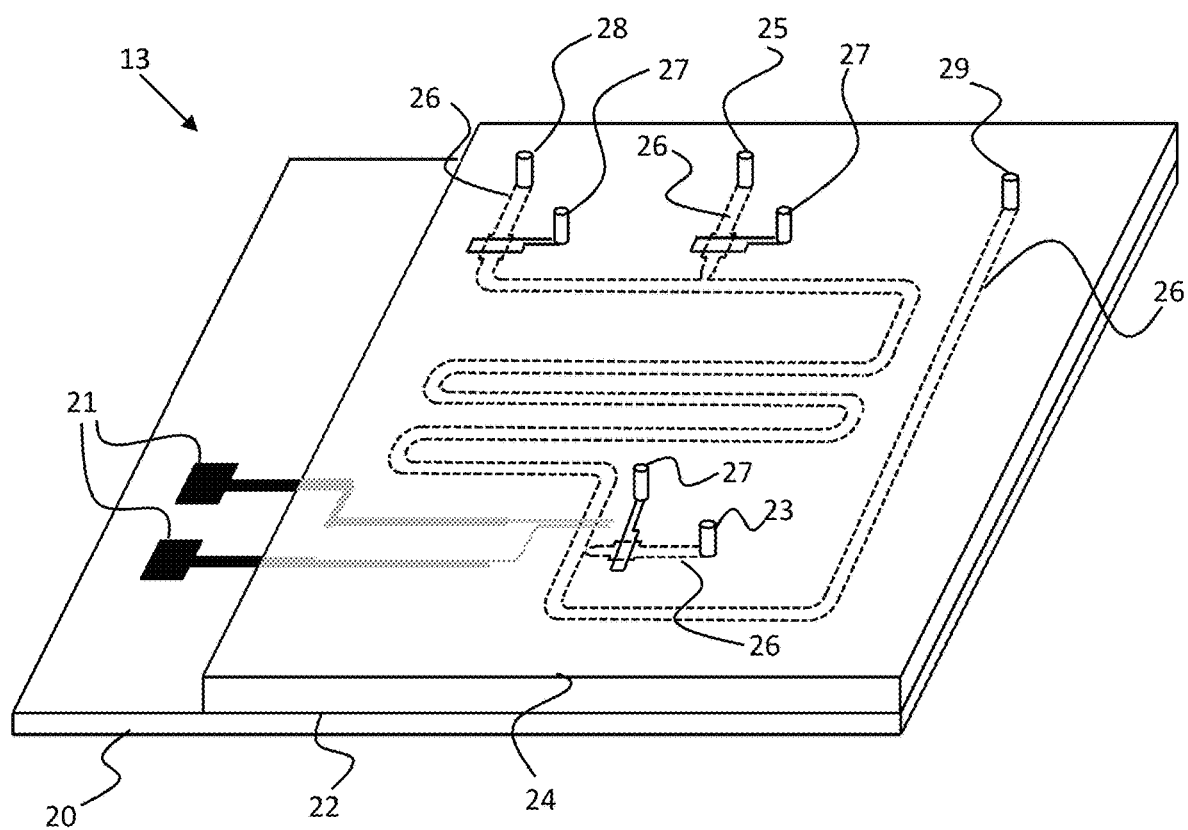
FIG. 2 is a schematic diagram of the microfluidic chip, according to an embodiment of the present disclosure.

FIG. 2 is a schematic diagram of the microfluidic chip 13, according to an embodiment of the present disclosure. As shown in FIG. 2, the microfluidic chip 13 includes a substrate 20, a channel layer 22 attached to the substrate 20 and a fluid control layer 24 operatively connected to the channel layer 22. In an embodiment, the fluid control layer 24 is disposed on top of the channel layer 22. In an embodiment, the channel layer 22 and the fluid control layer 24 are formed from materials that do not require surface treatment for fluid flow. The channel layer 22 has one or more fluid channels 26 and one or more fluid input ports 23, 25, 28 connected to the one or more fluid channels 26. In an embodiment, the input port 28 can be used to introduce a buffer solution, such as for example oil, the input port 25 can be used to introduce a sample solution, for example a saline solution containing a sample (e.g., a biological sample) into the one or more fluid channels 26, and the input port 23 can be used to introduce at least one reagent chemical into the one or more fluid channels 26, the reagent molecule selected to react with the sample. In an embodiment, the channel layer 22 may also include an output port 29 that is configured to output any solution introduced in the one or more fluid channels 26. A flow of fluid in one or more fluid channels 26 is controlled by the opening or closing using one or more valves 27. In an embodiment, the valves 27 can be operated (e.g., opened or closed) by applying hydraulic pressure or by using other means such as an electrically generated force (for example, using the piezoelectric effect).

As shown in FIG. 1, the microfluidic system 10 also includes a fluid input system 15 fluidly connected to the one or more fluid input ports 23, 25 and 28 of the channel layer 22. The fluid input system 15 is configured to input at least the sample solution, the buffer solution and at least one reagent through the input ports 28, 25 and 23, respectively. The one or more channels 26 are configured to contain a plurality of droplets, the plurality of droplets comprising at least the sample solution and separated from each other by the buffer solution.

As shown in FIG. 1, the microfluidic system 10 also includes a valve control system 12 operatively connected to the fluid control layer 24 (shown in FIG. 2) of the microfluidic chip 13 to selectively open and close a plurality of valves 27 in the channel layer 22 to control flow of fluid through the one or more fluid channels 26 in the channel layer 22 (shown in FIG. 2). The microfluidic system 10 further includes a droplet detection and feedback control system 11 and 14 operatively connected to the valve control system 12. The droplet detection and feedback control system includes an impedance-based droplet detection system 14 and a computer system 11 for reading an output of the impedance-based droplet detection system 14. The droplet detection and feedback control system 11, 14 is configured to detect at least a position of at least one droplet in a fluid channel in the one or more fluid channels 26 and to send a signal to the valve control system 12 through communication line 16 to operate a particular valve in the plurality of valves 27 at a particular time based on the detected at least position of the at least one droplet. In an embodiment, the impedance-based droplet detection system 14 is connected to probes 21 provided in the microfluidic chip 13 via electrical lines 18. The impedance-based droplet detection system 14 is further connected to the computer system 11 through signal or data lines 19. In an embodiment, the probes 21 include a pair of electrical lines or electrodes. When a droplet travels over the probes/electrodes 21, the impedance across the pair of electrodes 21 changes (for example, drops or increases) and the impedance is measured by the impedance detection system (e.g., impedance measurement circuit) 14 via electrical lines 18 and the impedance detection system 14 outputs an impedance signal corresponding to properties of the impedance which is inputted into the computer system 11 through data/signal lines 19. In an embodiment, the electrodes 21 are deposited on the substrate 20, for example using an evaporative process. In an embodiment, the electrodes comprise gold (Au) to enhance electrical conductance and thus enhance sensitivity to impedance measurements.

In an embodiment, the impedance signal can be used to determine a type of material within the droplet, as the impedance is linked to dielectric properties of a material. As it must be understood by one of ordinary skill in the art, the impedance can also be defined as a ratio between a voltage applied across a material and a current flowing through the material. It is also known as the measure of the opposition that a circuit/material presents to a current when a voltage is applied to the circuit or material. The impedance extends the concept of resistance in direct current/voltage (DC) circuits to alternating current (AC) and/or direct current (DC) circuits. Therefore, generally, the impedance (generally noted as Z) is a complex variable that has a real part and an imaginary part. As a result, the impedance has a magnitude and a phase. The magnitude is the ratio of the voltage amplitude to the current amplitude and phase is the phase shift by which the current lags the voltage.

In an embodiment, a change of impedance across the pair of electrodes 21 can also be used for timing a movement or travel (e.g., distance, speed) of a droplet of a fluid inside the fluid channel 26. For example, in one embodiment, the two electrodes 21 are placed upstream of a hydraulic microfluidic valve 27, perpendicular to and in contact with the fluid channel, as depicted in FIG. 2. When a droplet passes the electrodes 21, the impedance is measured by the impedance measurement circuit 14 and an impedance signal is transmitted to the computer system 11. The computer system running a program is able to detect the change in impedance when the droplet reaches the electrodes 21. The program running on the computer system 11 instructs the computer system 11 to wait a predetermined delay time prior to sending a signal or command through communication line 16 to the valve control system 12 to operate a particular valve in the plurality of valves 27 (valve 27 that is located downstream of the electrodes 21) for successful reagent injection into the droplet.

The electrodes create an electric potential field between them that measures the conductivity and storage capacity of a material in proximity. The way this material affects an alternating current signal in response to an alternating voltage signal is known as impedance. Suspension fluids for droplet microfluidics are often oils which have high characteristic impedance relative to the droplets. Therefore, when the droplets travel over the electrodes, the impedance changes and this change in signal can be detected with software. If the droplets are uniform with a known size, only two electrodes are needed to measure the speed of the droplet based on the length of the change in impedance. If the droplets vary in size or their size is unknown four electrodes can be implemented to capture all that information. With four electrodes, the time between the drop in the first impedance signal and the second impedance signal indicates the speed of the traveling droplet. With the speed known, the length of the droplet can be calculated from the length of the signal change on a single electrode pair. With the speed and the size of the droplet known, the software is able to calculate the time to delay before the droplet reaches the injection point based on the distance from the electrodes to the injection point. This ensures successful injection of every droplet.

In an embodiment, the droplet detection and feedback control system 11 and 14 is configured to calculate a time delay between a detection of a droplet and operation of the particular valve 27 (located downstream of the electrodes 21) based on a known droplet-travel distance between the detected position of the at least one droplet (i.e., the location of the electrodes 21) and the position of the particular valve 27 and a speed of the droplet detected. In an embodiment, by inputting a distance between the position of the pair of electrodes 21 and the position of the valve 27 into the computer system 11, the computer program or algorithm is able to calculate a time a droplet can take to travel the distance by dividing the distance by the velocity of the droplet. In an embodiment, for example in the case using a single pair of electrodes 21, the velocity can be acquired from a previous calibration or previous measurement. In an embodiment, the computer system 11 can add the computed time to the initial time the droplet is detected with the droplet detection system (e.g., impedance measurement circuit) 14 and records that time and sends a command to the valve controller 12 to open the valve 27 when the recorded time is reached. In another embodiment, once the computer system 11 receives a signal that a droplet is detected by the pair of electrodes, the computer system 11 starts (a clock) counting time and sends a command to the microfluidic valve controller 12 after the calculated time is reached. Hence, the valve 27 is opened when the droplet reaches the valve 27. As a result, the reagent is injected directly into the droplet.

It should be noted that the impedance-based droplet detection system is not limited to only the number and arrangement of electrodes shown above as examples. For example, there could be two, three, four or more electrodes in some embodiments of the impedance-based droplet detection system.

Figure 3:
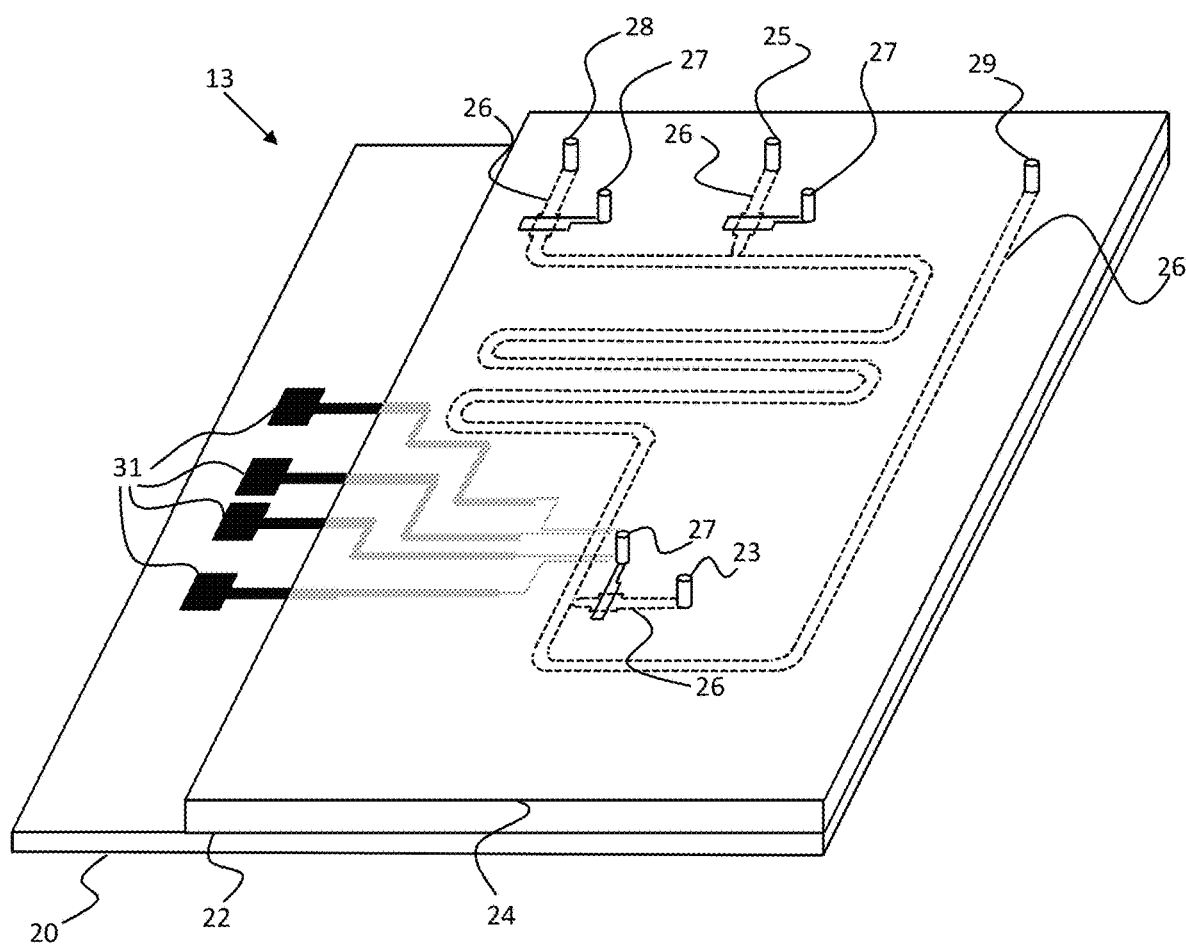
FIG. 3 is a schematic diagram of the microfluidic chip, according to another embodiment of the present disclosure.

FIG. 3 is a schematic diagram of the microfluidic chip 13, according to another embodiment of the present disclosure. The microfluidic chip 13 depicted in FIG. 3 is similar in many aspects to the microfluidic chip shown in FIG. 2. Therefore, same reference numerals are used in FIG. 3 to indicate same components as in the microfluidic chip 13 shown in FIG. 2. The detailed description of these components is provided in the above paragraphs and thus is not repeated for this embodiment. However, it must be noted that one distinction between the embodiment of the microfluidic chip 13 of FIG. 2 and the embodiment of the microfluidic chip 13 of FIG. 3 is that the microfluidic chip 13 of FIG. 3 has four electrodes 31, instead of a couple of electrodes 21 shown in FIG. 2. In the embodiment shown in FIG. 2, the velocity is determined based on a prior calibration or measurement. In the embodiment shown in FIG. 3, the velocity can be determined using two pairs of spaced apart electrodes 31. Indeed, since a distance between the two pairs of electrodes 31 can be measured, the velocity can be calculated by simply dividing the distance between the two pairs of electrodes 31 by the time a droplet takes to travel from a location or position of a first pair of electrodes 31 to a location or position of a second pair of electrodes 31. The time it takes for a droplet to travel from the location of the first pair of electrodes 31 to the location of the second pair of electrodes 31 can be determined simply by using a "stopwatch" (e.g., the computer clock or other clock) wherein the clock reset is provided by the detection signal of the droplet by the first pair of electrodes 31 and the clock stop is provided by the detection signal of the droplet by the second pair of electrodes 31. Similar to the embodiment shown in FIG. 2, since the distance between the first or second pair of electrodes 31 to the position of the valve 27 can be measured, the transit or travel time of the droplet from the first or the second pair of electrodes 31 to the valve position of the valve 27 can be computed by dividing the measured distance by the calculated velocity. After the computed travel time is reached, the computer system 11 can send a command to the valve controller 12 to open valve 27. Hence, the valve 27 is opened when the droplet reaches the valve 27. As a result, the reagent is injected directly into the droplet.

The droplets containing the sample solution in the one or more fluid channels 26 are spaced apart by the buffer solution. In an embodiment, the droplet detection and feedback control system 14 and 11 is further configured to calculate a length of a droplet using a speed of the droplet and a time period between a change of electrical impedance from an electrical impedance of the buffer solution to an electrical impedance of the sample solution in the droplet to a change of electrical impedance back from the electrical impedance of the sample solution to the electrical impedance of the buffer solution. In an embodiment, the speed of the droplet can be, for example, measured using two pairs of spaced apart electrodes 31, as described in the above paragraph. In another embodiment, the speed of a droplet can be measured using a calibration method prior to manually inputting the speed into the computer system 11.

Figure 4:
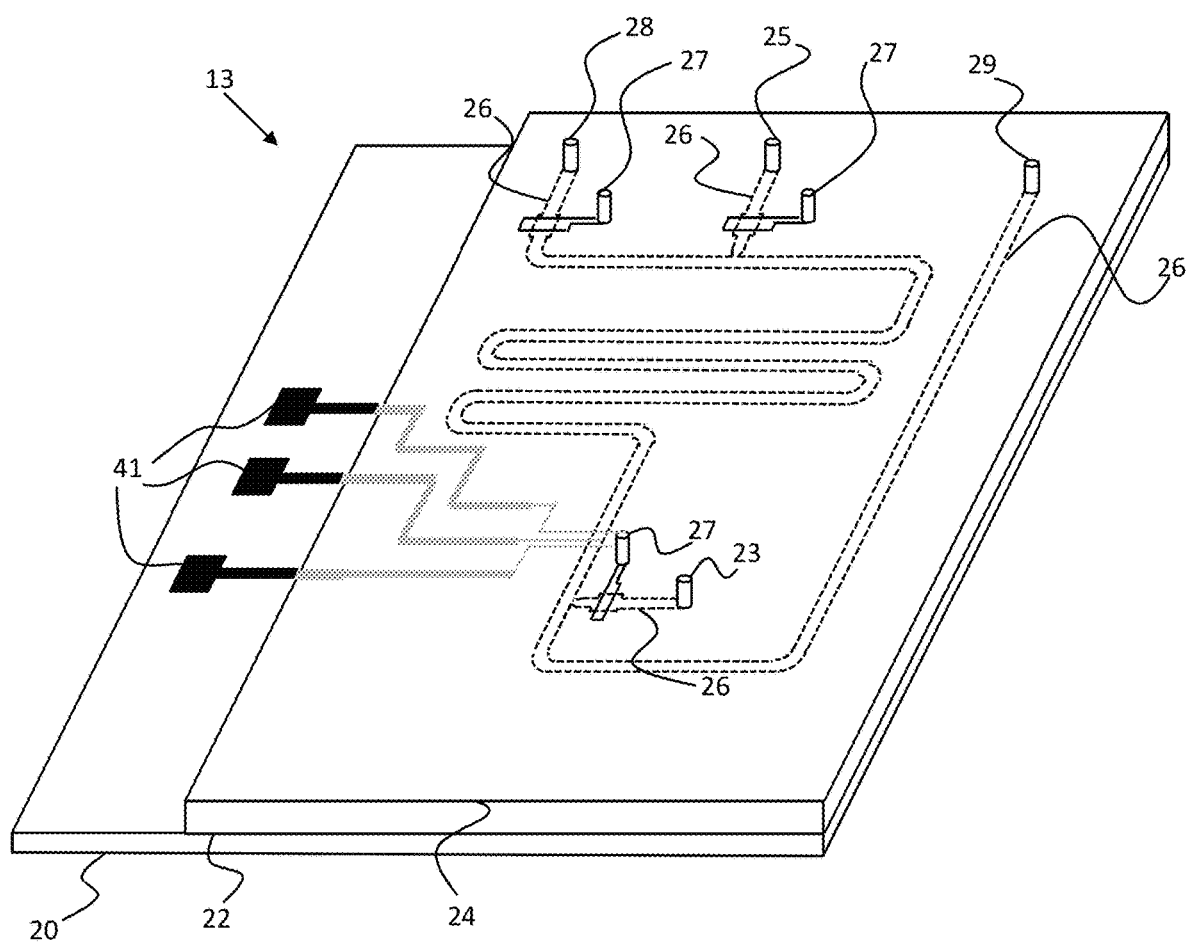
FIG. 4 is a schematic diagram of the microfluidic chip, according to another embodiment of the present disclosure.

FIG. 4 is a schematic diagram of the microfluidic chip 13, according to another embodiment of the present disclosure. The microfluidic chip shown in FIG. 4 is similar in many aspects to the embodiment of the microfluidic chip shown in FIG. 3. Therefore, the description of similar components labeled by same reference numerals is not repeated for FIG. 4. However. However, it must be noted that one distinction between the embodiment of the microfluidic chip 13 of FIG. 3 and the embodiment of the microfluidic chip 13 of FIG. 4 is that the microfluidic chip 13 of FIG. 4 has 3 electrodes 31, instead of a four electrodes 31 shown in FIG. 3. The present three electrodes 41 shown in FIG. 4 also allow to measure a speed of droplet in the same manner as described above in the case of four electrodes 31. In the present embodiment, however, instead of using two electrodes connected to the mass (i.e., potential zero), one common electrode (center electrode) is used. In an embodiment, the common (center) electrode can be connected to a voltage source to energize the electrodes 41 while the two outer electrodes in electrodes 41 are connected to the impedance measurement circuit 14 to measure a voltage across the center electrode and one outer electrode and across the center electrode and the other outer electrode. Similarly to the above embodiment of the microfluidic chip 13, the speed is measured by measuring a time it takes the droplet to travel the distance between the first pair of electrodes 41 (with one electrode in the pair being the common electrode) and the second pair of electrodes (with one electrode in the pair being the common electrode). Similar to the above embodiment showing FIG. 3, the distance between the first pair of electrodes 41 and the second pair of electrodes 41 which in the present case is the distance between the first electrode in the first pair of electrodes 41 and the second electrode in the second pair of electrodes 41 is then divided by the measured time to determine the velocity of the droplet within the fluid channel 26. Although, in this example, the center electrode is described as being connected to a voltage source and the outer electrodes in electrodes 41 are connected to the impedance measurement circuit 41 to provide a voltage or signal due to electrical impedance, it is also contemplated that the middle or center common electrode in electrodes 41 be connected to the impedance measurement circuit 14 to provide a voltage signal due to electrical impedance while the outer electrodes be connected to the voltage source for energizing the electrodes 41.

Figure 5:
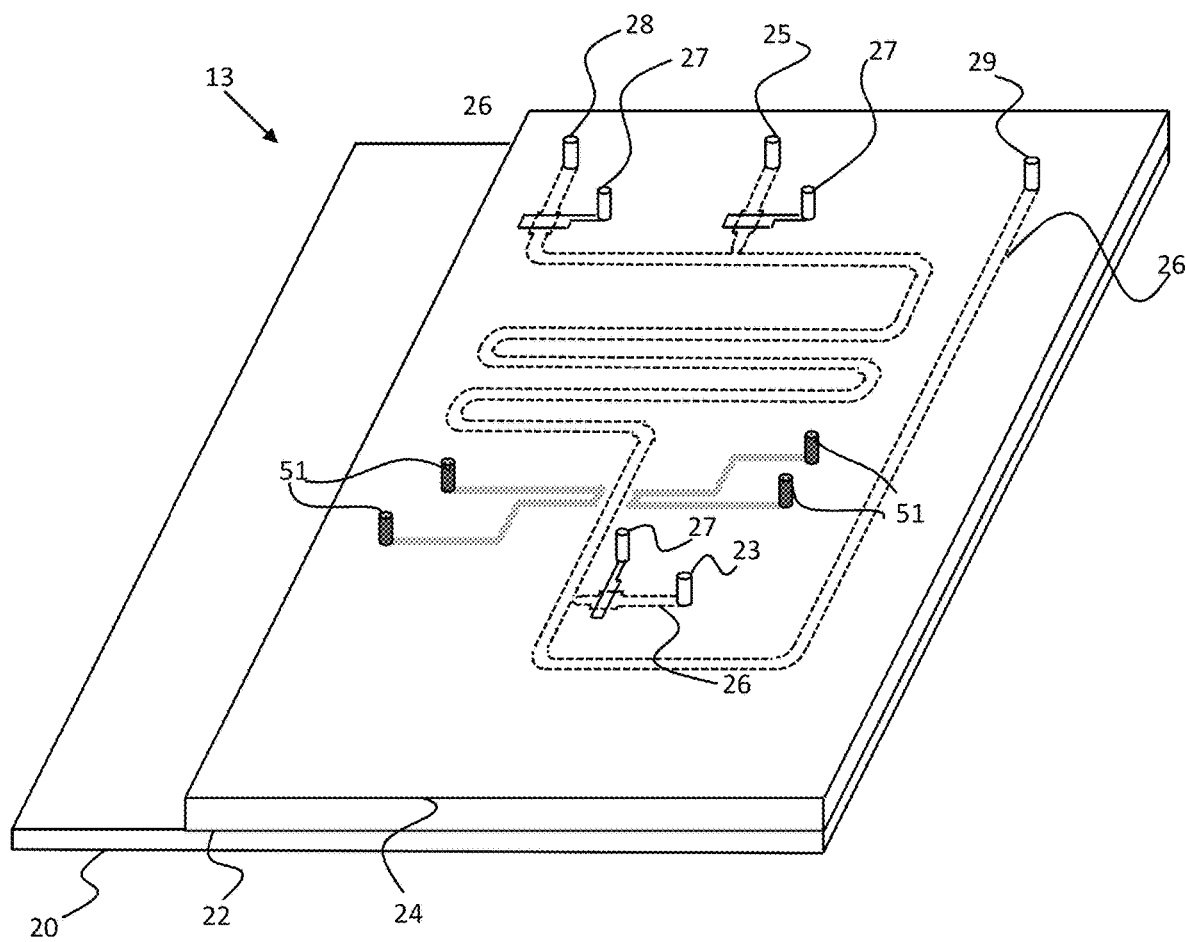
FIG. 5 is a schematic diagram of the microfluidic chip, according to yet another embodiment of the present disclosure.

FIG. 5 is a schematic diagram of the microfluidic chip 13, according to yet another embodiment of the present disclosure. The microfluidic chip shown in FIG. 4 is similar in many aspects to the embodiment of the microfluidic chip shown in FIG. 2. Therefore, same reference numerals are used in FIG. 4 to indicate same or similar components as in the microfluidic chip 13 shown in FIG. 2. The detailed description of these components is provided in the above paragraphs and thus is not repeated for this embodiment. However, it must be noted that one distinction between the embodiment of the microfluidic chip 13 of FIG. 2 and the embodiment of the microfluidic chip 13 of FIG. 4 is that the microfluidic chip 13 of FIG. 3 has parallel electrodes 51, instead of coplanar electrodes 21 shown in FIG. 2. In the embodiment shown in FIG. 2, the electrodes are coplanar in a sense that the two electrodes of the pair of electrodes 21 are spaced apart from each other along a length of the one or more fluid channels in a direction of movement of the droplet. Whereas in the embodiment of the microfluidic chip 13 shown in FIG. 5, the pair of electrodes 51 are arranged in a parallel configuration wherein the pair of electrodes 51 are disposed on opposite sides of fluid channel 26 such that the pair of electrodes 51 are spaced apart from each other by at least a thickness of the fluid channel 26. In an embodiment, the electrodes 51 are solder injected onto microfluidic channels to create parallel electrodes across the fluid channel 26.

Figure 6:
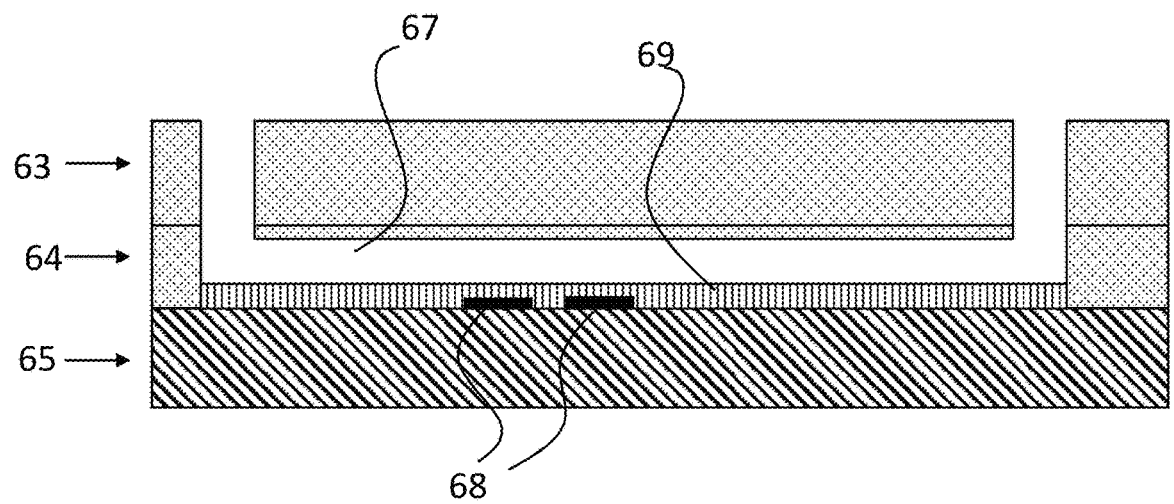
FIG. 6 is a cross-sectional view of the microfluidic chip showing the position of a pair of electrodes in a co-planar configuration, according to an embodiment of the present disclosure.

FIG. 6 is a cross-sectional view of the microfluidic chip 13 showing the position of a pair of electrodes 68 in a co-planar configuration, according to an embodiment of the present disclosure. The microfluidic chip 13 has three layers: a fluid control layer 63, a channel layer 64, and a substrate 65. In this embodiment, electrodes 68 are patterned onto the substrate 65. In an embodiment, the substrate comprises glass. The channel layer 64 is deposited on the substrate 65 (e.g., glass). The channel layer 64 has one or more fluid channel 67 formed therein. The channel layer can be formed from polydimethylsiloxane (PDMS). Since glass is exposed to the channel layer 64 and is hydrophilic in nature, a hydrophobic coating 69 can be used to allow droplets to better flow in the channel 67 formed in the channel layer 64. Droplets can flow through the fluid channel 67 in the channel layer 64 and the position and content of the droplets can be determined by using the electrodes 68 along with an impedance measurement circuit 14 (shown in FIG. 1). As shown in FIG. 6, the electrodes 68 are in a co-planar configuration similar to the examples shown in FIGS. 2-4 in that the electrodes 68 are spaced apart along a length of the channel 26 in the direction of movement of the droplet.

Figure 7:
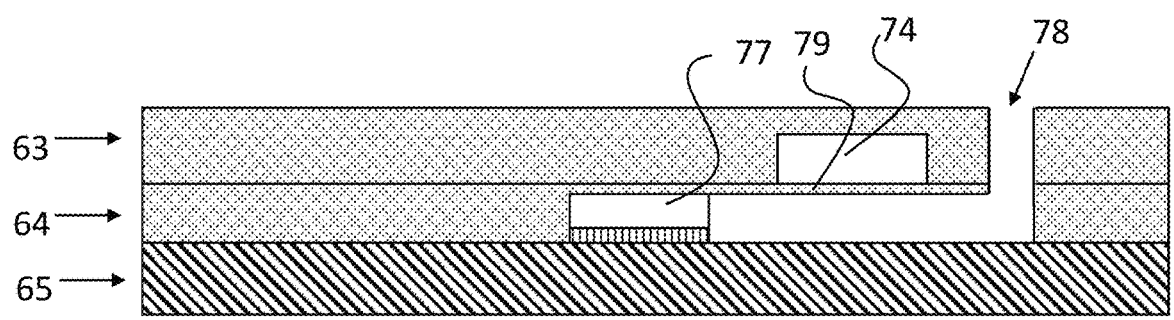
FIG. 7 is a cross-sectional view of the microfluidic chip showing the position the mixing or injection region, according to an embodiment of the present disclosure.

FIG. 7 is a cross-sectional view of the microfluidic chip 13 showing the position the mixing or injection region, according to an embodiment of the present disclosure. This view is a 90 degree rotation of the cross-sectional view shown in FIG. 6. FIG. 7 shows a mixing/injection channel 78 (corresponding to channel 26 connected to inlet 23 in FIG. 2) connecting to the main fluid channel 77 (corresponding to main fluid channel 26 in FIG. 2). The hydraulic valve 27 (shown in FIG. 2) is actuated by pressurizing hydraulic channel 74. When the hydraulic channel 74 of the hydraulic valve 27 is pressurized in the channel control layer 63, it collapses the channel layer 64 by collapsing the inlet 79 connecting the channel 78 to the main channel 77 (or channel 26 as shown in FIG. 2). The substrate 65 supports the PDMS. The electrodes 68 (shown in FIG. 6) can be located upstream of this mixing/injection input 78.

Figure 8:
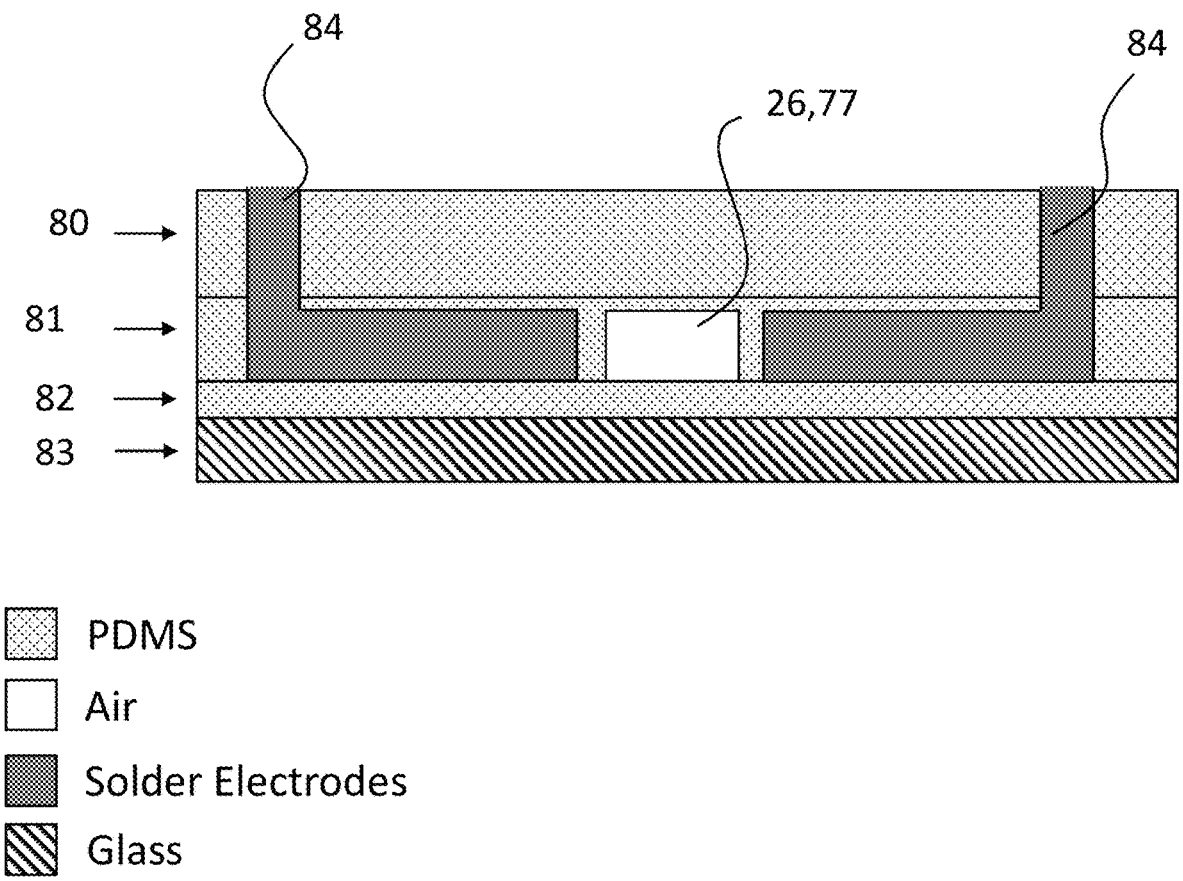
FIG. 8 is a cross-sectional view of the microfluidic chip showing the position the electrodes in parallel configuration, according to an embodiment of the present disclosure.

FIG. 8 is a cross-sectional view of the microfluidic chip 13 showing the position the electrodes in parallel configuration, according to an embodiment of the present disclosure. For example, the electrodes 84 are solder injected onto microfluidic channels to create parallel electrodes across the main fluid channel 26, 77. In an embodiment, solder electrodes 84 fill through a channel that punctures the channel control layer 80 for easy connection to probes and fills channels similar to the fluid channel 26, 77 in the channel layer 81 of the microfluidic chip device 13. In an embodiment, the substrate (e.g., glass layer) 83 does no longer needs to touch the channel 26. Therefore, in this case, another PDMS layer 82 can act as the bottom of the channel 26, 77. As a result, in this embodiment, the channel 26, 77 does not require a hydrophobic coating.

Figure 9:
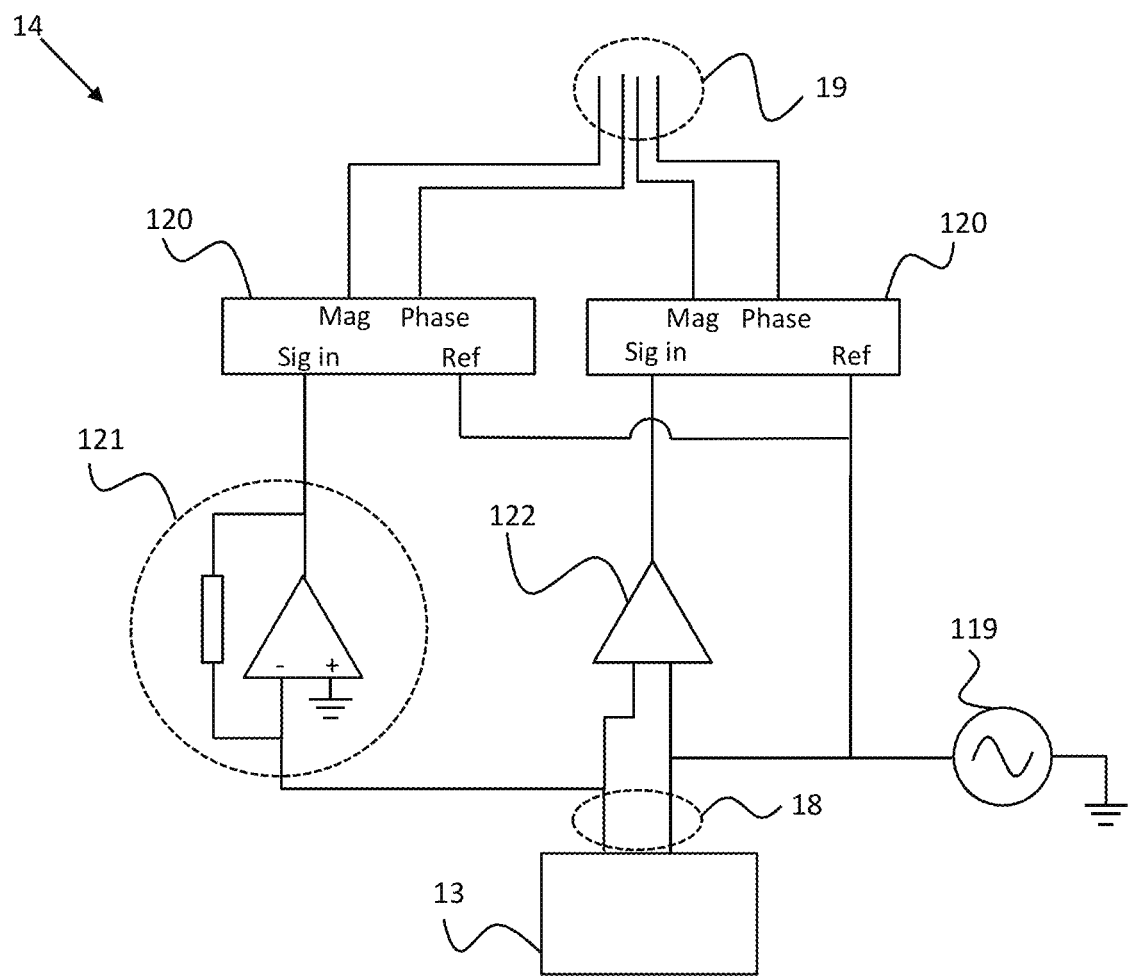
FIG. 9 is an electrical schematics of an impedance measurement circuit, according to an embodiment of the present disclosure.

FIG. 9 is an electrical schematics of an impedance measurement circuit 14, according to an embodiment of the present disclosure. In an embodiment, one or more impedance measurement units 14 can be provided depending on a number of electrodes used in the microfluidic chip device 13. In order to measure an unknown impedance in between two probes or electrodes 21, 31, 41, 51, a signal or voltage is supplied from a signal source 119. The voltage drop across the microfluidic chip 13, i.e., across the fluid channel 26, is input into differential amplifier 122 through electrical lines 18 each of which is also connected to a corresponding electrode in electrodes 21, 31, 41 and 51. The differential amplifier 122 measures the voltage drop. The current through the microfluidic chip 13, i.e., through the electrodes 21, 31, 41 and 51 is measured with a trans-impedance amplifier 121 that changes the current to voltage for analysis. Two lock-in amplifiers 120 connected to the outputs of the differential amplifier 122 and trans-impedance amplifier 121 take in the voltage drop and current signals and output the respective magnitude and phase of the signal. This information on the signal is sent to the computer system 11 (shown in FIG. 1) through the data lines 19. The computer system 11 receives these voltages and transforms these voltages into data corresponding to an amplitude of the electrical impedance across the electrodes and a phase of the electrical impedance across the electrodes.

Therefore, as it can be appreciated, the voltage source 119 is electrically connected to the at least one pair of electrodes 21, 31, 41, 51. The voltage source 119 is configured to supply a voltage signal to the at least one pair of electrodes. The voltage can be a direct current (DC) voltage or an alternating current (AC) voltage. The impedance measurement circuit 14 includes a voltage measurement device (e.g., the differential amplifier 122) that is electrically connected to the at least one pair of electrodes 21, 31, 41, 51. The voltage measurement device (e.g., the differential amplifier 122) is configured to measure a voltage drop across the at least one pair of electrodes 21, 31, 41, 51. The impedance measurement device 14 also includes a current measurement device (e.g., trans-impedance amplifier 121) that is electrically connected to the at least one pair of electrodes 21, 31, 41, 51. The current measurement device is configured to measure a current across the at least one pair of electrodes 21, 31, 41, 51. The electrical impedance of the material between the at least one pair of electrodes 21, 31, 41, 51 is determined based on current and voltage drop across the at least one pair of electrodes 21, 31, 41, 51.

Figure 10:
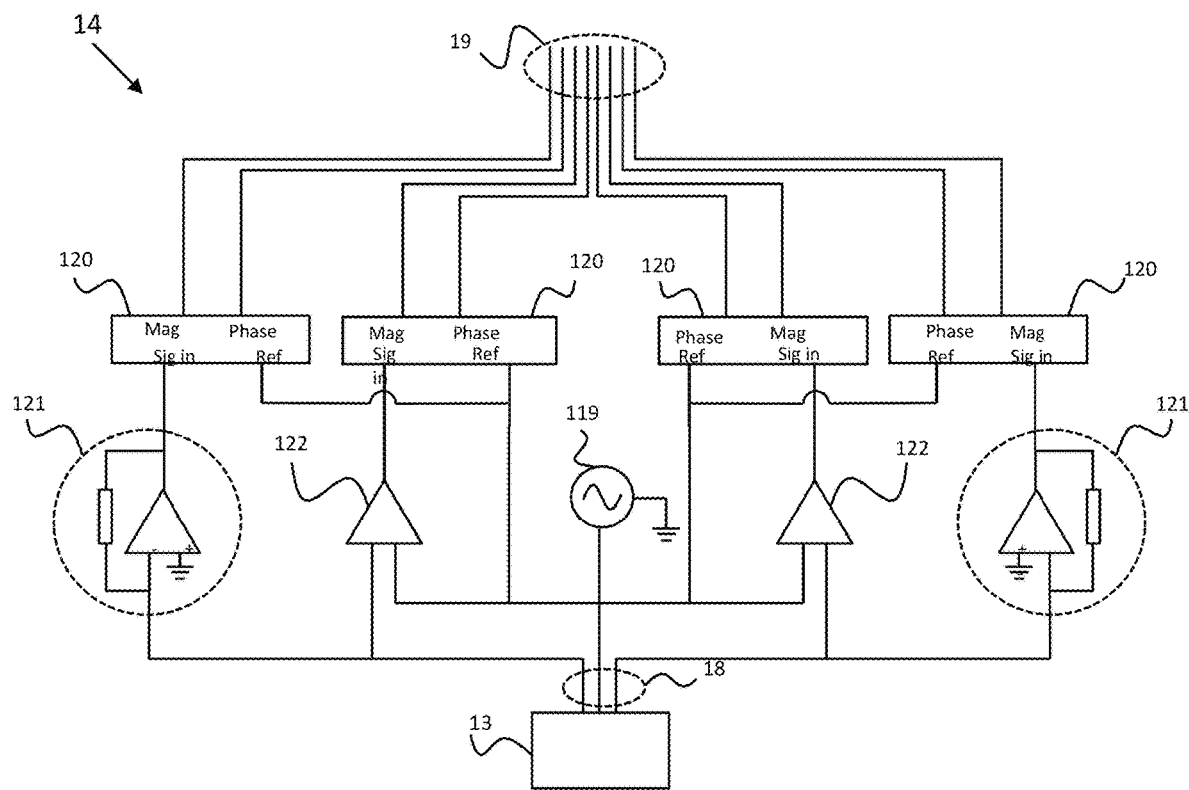
FIG. 10 is an electrical schematics of an impedance measurement circuit, according to another embodiment of the present disclosure.

FIG. 10 is an electrical schematics of an impedance measurement circuit 14, according to another embodiment of the present disclosure. In this embodiment, the impedance measurement circuit 14 shown in FIG. 10 for a configuration using three probes or electrodes 41 in the microfluidic chip (see, for example, the embodiment shown in FIG. 4). In embodiment, there are three probes 41 used in the microfluidic device 13. The source or voltage signal 119 is connected to the center electrode in electrodes 41 while the outer electrodes in electrodes 41 are used to measure the impedance between these outer electrodes and the center electrode in electrodes 41. The impedance measurement circuit 14 includes differential amplifiers 122 which measure the voltage drop across the electrodes. The impedance measurement circuit also includes trans-impedance amplifiers 121 that changes the current across the electrodes to voltage for analysis. The voltage drop across the microfluidic chip 13, i.e., across the fluid channel 26, is input into the differential amplifiers 122 through electrical lines 18 each of which is also connected to a corresponding electrode in electrodes 41. The impedance measurement circuit 14 includes four lock-in amplifiers 120 connected to the outputs of differential amplifiers 122 and trans-impedance amplifiers 121 to extract the phase and magnitude of the voltage and current signals for each electrode pair in the electrodes 41. The computer system 11 receives these voltages and transforms these voltages into data corresponding to an amplitude of the electrical impedance across the electrodes and a phase of the electrical impedance across the electrodes.

Figure 11:
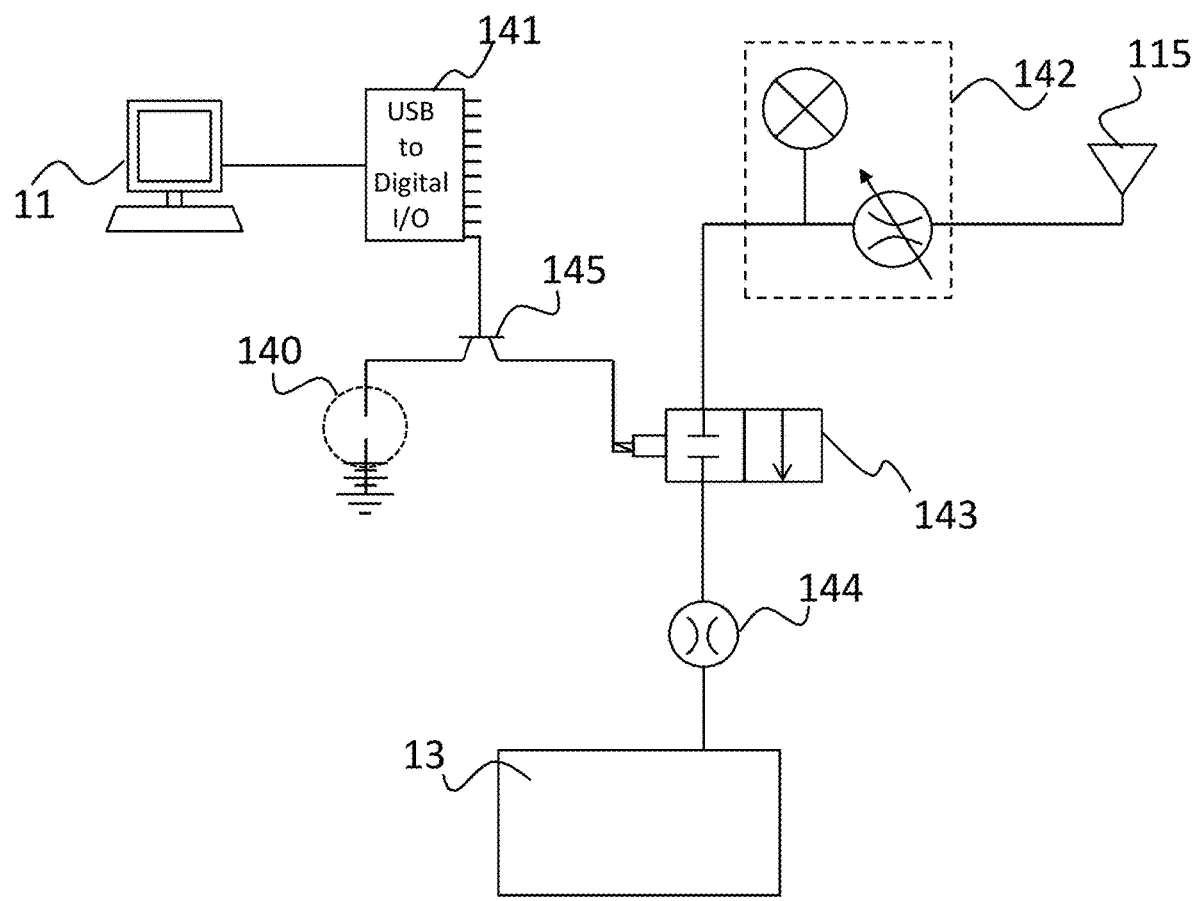
FIG. 11 is a schematic diagram of a pressure controller for controlling various valves in the microfluidic chip device, according to an embodiment of the present disclosure.

FIG. 11 is a schematic diagram of a pressure controller for controlling various valves in the microfluidic chip device 13, according to an embodiment of the present disclosure. In an embodiment, a pressure source 115 supplies pressurized fluid (e.g., air) to a pressure regulator 142. The pressure regulator 142 can control the amount of pressure supplied to a solenoid valve 143. The solenoid valve 143 is supplied by high power from the wall voltage outlet 140. The current is turned ON and OFF by a transistor 145 which is activated by a small voltage provided by a series of digital in/out pins 141 controlled by the computer system 11. When the solenoid valve 143 is activated the pressure travels through tubing 144 which acts as an orifice before the pressure arrives at the microfluidic device/chip 133 to control various fluid valves in the microfluidic chip 13.

Figure 12A:
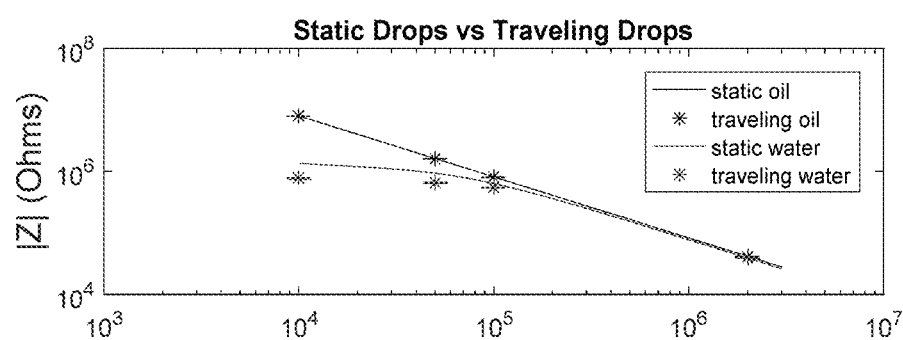
FIG. 12A is a plot of a magnitude versus frequency of an electrical impedance of oil and water measured when the water and oil is stationary and the magnitude of an electrical impedance of oil and water when in movement (i.e., traveling) inside the fluid channels, according to an embodiment of the present disclosure.

FIG. 12A is a plot of a magnitude versus frequency of an electrical impedance of oil and water measured when the water and oil is stationary and the magnitude of an electrical impedance of oil and water when in movement (i.e., traveling) inside the fluid channels, according to an embodiment of the present disclosure. As shown by this plot, the magnitude of the electrical impedance of both oil and water substantially match the magnitude of the electrical impedance of oil and water in a stationary state.

Figure 12B:
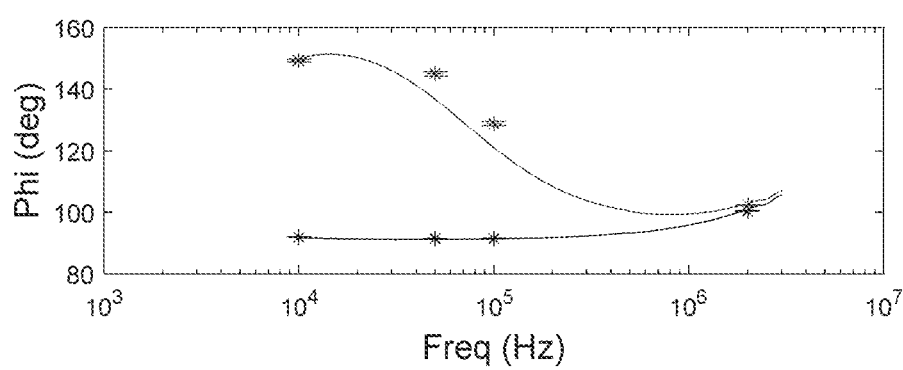
FIG. 12B is a plot of a phase versus frequency of an electrical impedance of oil and water measured when the water and oil is stationary and the magnitude of an electrical impedance of oil and water when in movement (i.e., traveling) inside the fluid channels, according to an embodiment of the present disclosure.

FIG. 12B is a plot of a phase versus frequency of an electrical impedance of oil and water measured when the water and oil is stationary and the magnitude of an electrical impedance of oil and water when in movement (i.e., traveling) inside the fluid channels, according to an embodiment of the present disclosure. As shown by this plot, the phase of the electrical impedance of both oil and water substantially match the phase of the electrical impedance of oil and water in a stationary state.

Figure 13A:
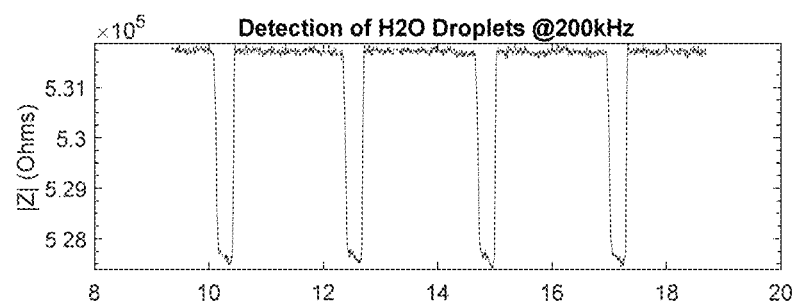
FIG. 13A is a plot of a magnitude of the electrical impedance versus time (in seconds) of water droplets detected using the microfluidic system, according to an embodiment of the present disclosure.

FIG. 13A is a plot of a magnitude of the electrical impedance versus time (in seconds) of water droplets detected using the above microfluidic system 10, according to an embodiment of the present disclosure. A detection of a water droplet is reflected in this plot by a drop in the magnitude of the electrical impedance across the electrodes/probes. Each time a droplet of water crosses the area where the electrodes are positioned, the electrical impedance measured across the electrodes drops. The separation in time between a series impedance signal perturbations corresponds to separation in distance between the droplets of water. This plot was obtained when using an AC voltage source having a frequency of 200 kHz. However, as it must be appreciated, similar results can also be obtained when using a voltage source that is set at another frequency (including frequency 0 which corresponds to a DC voltage).

Figure 13B:
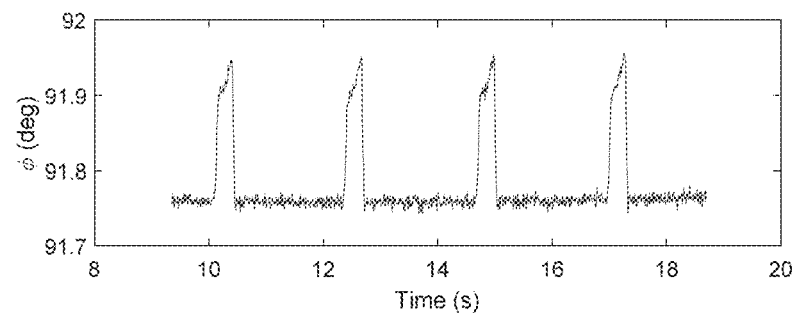
FIG. 13B is a plot of a phase of the electrical impedance versus time (in seconds) of water droplets detected using the microfluidic system, according to an embodiment of the present disclosure.

FIG. 13B is a plot of a phase of the electrical impedance versus time (in seconds) of water droplets detected using the above microfluidic system 10, according to an embodiment of the present disclosure. A detection of a water droplet is reflected in this plot by a peak in the phase of the electrical impedance. Each time a droplet of water crosses the area where the electrodes are positioned, the phase of impedance measured across the electrodes drops shifts. The separation in time between a series or train of water droplet signals corresponds to separation in distance between the droplets of water.

Figures 14A, 14B:
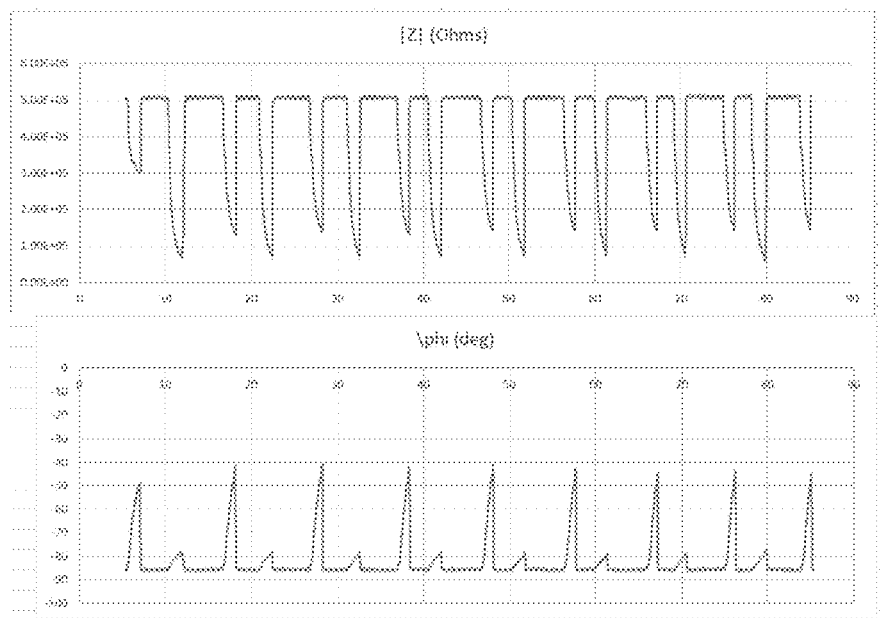
FIG. 14A is a plot of a magnitude of the electrical impedance versus time (in seconds) of water droplets and Phosphate Buffered Saline (PBS) droplets detected using the microfluidic system, according to an embodiment of the present disclosure.
FIG. 14B is a plot of a phase of the electrical impedance versus time (in seconds) of water droplets and PBS droplets detected using the microfluidic system 10, according to an embodiment of the present disclosure.

FIG. 14A is a plot of a magnitude of the electrical impedance versus time (in seconds) of water droplets and Phosphate Buffered Saline (PBS) droplets detected using the above microfluidic system 10, according to an embodiment of the present disclosure. A detection of a water droplet is reflected in this plot by a drop in the magnitude of the electrical impedance across the electrodes/probes. A detection of a PBS droplet/phase is also reflected in this plot by a drop in the magnitude of the electrical impedance across the electrodes/probes. However, the drop in magnitude of the electrical impedance for PBS is greater than the drop in magnitude of the electrical impedance for water. This feature shows that the microfluidic system 10 of the present disclosure is capable of distinguishing between two or more materials. In addition, as shown in FIG. 14A, each time a droplet of water or a droplet/phase of oil crosses the area where the electrodes are positioned, the electrical impedance measured across the electrodes drops. The separation in time between a series or train of water droplet signal corresponds to separation in distance between the droplets of water and/or between the droplets/phase of PBS.

FIG. 14B is a plot of a phase of the electrical impedance versus time (in seconds) of water droplets and PBS droplets detected using the above microfluidic system 10, according to an embodiment of the present disclosure. A detection of a water droplet is reflected in this plot by a peak in the phase of the electrical impedance across the electrodes/probes. A detection of a PBS droplet/phase is also reflected in this plot by a peak in the phase of the electrical impedance across the electrodes/probes. However, the height of the peaks in phase of the electrical impedance for water is greater than the height of the peaks in phase the electrical impedance for PBS. This feature also shows that the microfluidic system 10 of the present disclosure is capable of distinguishing between two or more materials by using the phase parameter. In addition, as shown in FIG. 14B, each time a droplet of water or a droplet of oil crosses the area where the electrodes are positioned, the phase of the electrical impedance measured across the electrodes peaks. The separation in time between a series or train of water droplet signals corresponds to a separation in distance between the droplets of water and/or between the droplets/phase of oil.

Figure 15A:
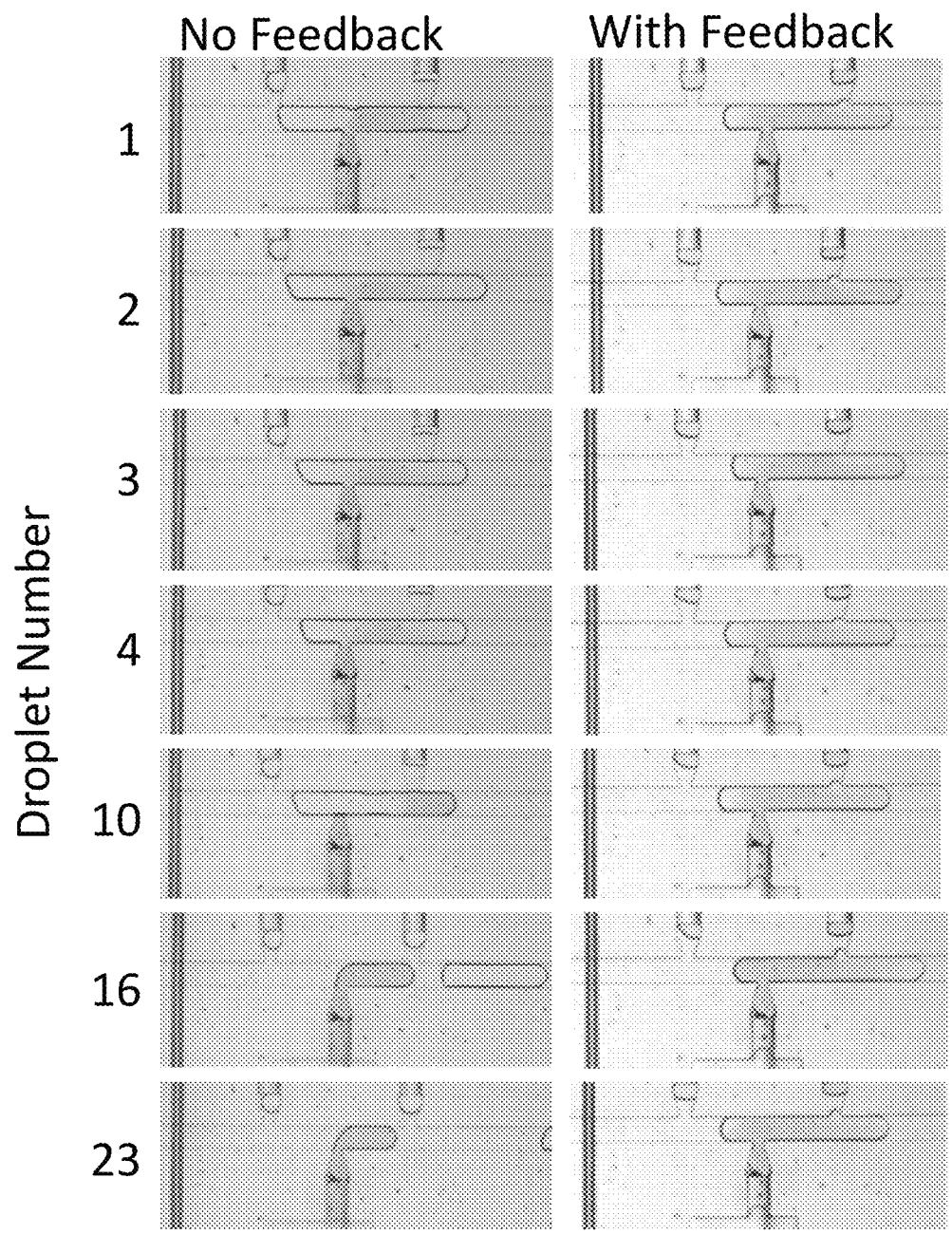
FIG. 15A illustrates visually the benefit of using a feedback system, according to an embodiment of the present disclosure.

FIG. 15A illustrates visually the benefit of using a feedback system, according to an embodiment of the present disclosure. On the right side of FIG. 15A are shown a series of images when using a feedback system and on left side of FIG. 15A are shown a series of images when not using a feedback system. These images demonstrate the effectiveness of feedback vs. no feedback. The "No Feedback" configuration always eventually starts to miss injections (see, for example droplet number 16 and 23 not successfully injected as intended) whereas the "Feedback" configuration droplet injection is always successful.

Figure 15B:
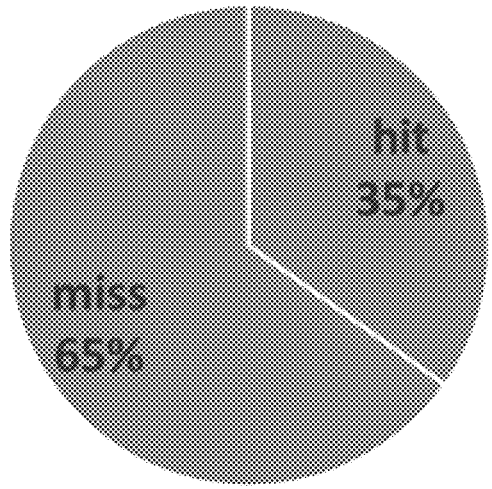
FIG. 15B are pie charts showing a comparison between results obtained using the feedback system of the microfluidic system and obtained without using the feedback system of the microfluidic system, according to an embodiment of the present disclosure.
Figure 15B:
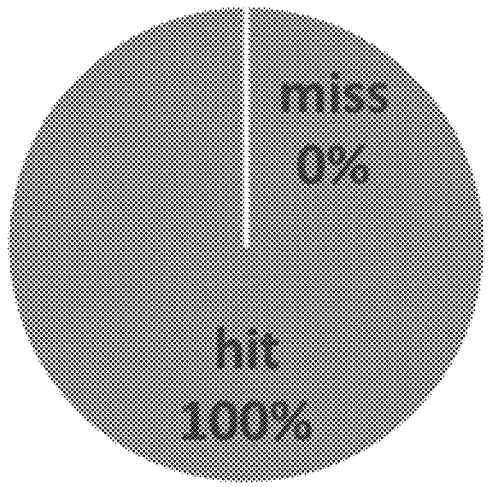

FIG. 15B are pie charts showing comparison between results obtained using the feedback system of the microfluidic system 10 and obtained without using the feedback system of the microfluidic system 10, according to an embodiment of the present disclosure. The pie charts present a percentage of successful injection of reagent into sample droplets versus a percentage of failed injection of reagent into sample droplets. The results in the upper pie chart are obtained without using the feedback system. The results in the lower chart are obtained with the use of the feedback system. The upper pie chart shows that with no feedback a number of failed reagent injections into sample droplets (65%) is greater than a number of successful reagent injections into sample droplets (35%). The lower pie chart shows that with feedback a number of successful reagent injections into sample droplets (100%) is greater than a number of failed reagent injections into sample droplets (0%). In addition, the success injection rate is substantially 100%. These results are obtained with a statistical sample of 100 droplets that are injected during a period of time of approximately 10 minutes. However, as it must be appreciated, similar results can also be obtained with any number of droplets.

Therefore, when using the feedback system to control the opening of the valve, the injection of the reagent chemical into the droplets is totally successful (100% success rate). The droplets are not missed in the injection process. This comparison shows that without feedback control, the injection was not successful most of the time. Whereas, when using the feedback control system of the microfluidic system 10, the rate of injection success can be brought to substantially 100%.

The term "computer system" is used herein to encompass any data processing system or processing unit or units. The computer system may include one or more processors or processing units. The computer system can also be a distributed computing system. The computer system may include, for example, a desktop computer, a laptop computer, a handheld computing device such as a PDA, a tablet, a smartphone, etc. A computer program product or products may be run on the computer system to accomplish the functions or operations described in the above paragraphs. The computer program product includes a computer readable medium or storage medium or media having instructions stored thereon used to program the computer system to perform the functions or operations described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer system or processor. The software also enables the computer system or processor to interact with a user via output devices such as a graphical user interface, head mounted display (HMD), etc. The software may also include, but is not limited to, device drivers, operating systems and user applications. Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods, functions or operations of the present disclosure.

REFERENCES

Zec, H., Bane, T. D., & Wang, T. H. (2012). Microfluidic platform for on-demand generation of spatially indexed combinatorial droplets. *Lab on a chip*, 12(17), 3055-3062.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A microfluidic system having feedback valve control, comprising:
    a microfluidic chip comprising a channel layer and a fluid control layer operatively connected to the channel layer, the channel layer comprising one or more fluid channels and one or more fluid input ports connected to the one or more fluid channels;
    a fluid input system fluidly connected to the one or more fluid input ports of the channel layer, the fluid input system being configured to input at least a sample solution, buffer solution and at least one reagent, wherein said one or more fluid channels are configured to contain a plurality of droplets, the plurality of droplets comprising at least the sample solution and separated from each other by the buffer solution;
    a valve control system operatively connected to the fluid control layer to selectively open and close a plurality of valves in the channel layer to control flow of fluid through the one or more fluid channels in the channel layer; and
    a droplet detection and feedback control system operatively connected to said valve control system and comprising an electrical impedance-based droplet detection system,
    wherein said droplet detection and feedback control system comprises at least one pair of spaced apart electrodes arranged proximate said one or more fluid channels of said channel layer to detect at least one droplet in a fluid channel in the one or more fluid channels due to a measured change of electrical impedance of said at least one droplet compared to said buffer solution,
    wherein the droplet detection and feedback control system is configured to detect at least a position of the at least one droplet in the fluid channel in the one or more fluid channels when the droplet travels over the at least one pair of spaced apart electrodes based on the measured change of electrical impedance of the at least one droplet passing across the at least one pair of spaced apart electrodes and to send a signal to the valve control system to operate a particular valve in the plurality of valves at a time calculated by the droplet detection and feedback control system based on the detected position of the at least one droplet and a velocity of the at least one droplet in the fluid channel.

2. The microfluidic system according to claim 1, further comprising a droplet generator configured to generate the plurality of droplets in the one or more fluid channels in the channel layer.

3. The microfluidic system according to claim 2, further comprising a fluid reservoir containing the sample solution, wherein the droplet generator comprises one or more valves in communication with the fluid reservoir containing the sample solution and with the one or more fluid input ports, the one or more valves being configured to open and close sequentially to introduce the sample solution in a form of the plurality of fluid droplets into the one or more fluid channels.

4. The microfluidic system according to claim 1, wherein an electrical impedance of a material between the at least one pair of electrodes is measured using an impedance measurement circuit comprising:
    a voltage source electrically connected to the at least one pair of electrodes, the voltage source being configured to supply a voltage signal to the at least one pair of electrodes;
    a voltage measurement device electrically connected to the at least one pair of electrodes, the voltage measurement device being configured to measure a voltage change across the at least one pair of electrodes; and
    a current measurement device electrically connected to the at least one pair of electrodes, the current measurement device being configured to measure a current across the at least one pair of electrodes,
    wherein the electrical impedance of the material between the at least one pair of electrodes is determined based on current and voltage change across the at least one pair of electrodes.

5. The microfluidic system according to claim 4, wherein the material comprises the sample solution or the buffer solution, or both.

6. The microfluidic system according to claim 4, wherein the voltage signal is a direct current (DC) voltage or an alternating current (AC) voltage.

7. The microfluidic system according to claim 1, wherein the at least one pair of electrodes are arranged in a coplanar configuration, wherein the at least one pair of electrodes are spaced apart from each other along a length of the one or more fluid channels in a direction of movement of the at least one droplet.

8. The microfluidic system according to claim 1, wherein the at least one pair of electrodes are arranged in a parallel configuration wherein the at least one pair of electrodes are disposed on opposite sides of the one or more fluid channels such that the at least one pair of electrodes are spaced apart from each other by at least a thickness of the one or more fluid channels.

9. The microfluidic system according to claim 1, wherein said droplet detection and feedback control system is configured to calculate a time delay between detection of said at least one droplet and operation of said particular valve based on a known droplet-travel distance between the detected position of the at least one droplet and the position of the particular valve and the velocity of the at least one droplet detected.

10. The microfluidic system according to claim 9, wherein the velocity of the detected at least one droplet is determined using a calibration method prior to manually inputting the velocity of the detected at least one droplet into the detection and feedback control system.

11. The microfluidic system according to claim 1, wherein the droplet detection and feedback control system comprises a first pair of electrodes and a second pair of electrodes arranged proximate said fluid channel in the one or more fluid channels of said channel layer to detect said at least one droplet due to a change of electrical impedance of said at least one droplet compared to said buffer solution, wherein the velocity of the at least one droplet is determined using a measured distance between the first pair of electrodes and the second pair of electrodes and a transit time of the at least one droplet between the first pair of electrodes and the second pair of electrodes.

12. The microfluidic system according to claim 1, wherein the droplet detection and feedback control system is further configured to calculate a length of said at least one droplet using a speed of said at least one droplet and a time period between a change of electrical impedance from an electrical impedance of the buffer solution to an electrical impedance of the sample solution of said at least one droplet to a change of electrical impedance back from the electrical impedance of the sample solution to the electrical impedance of the buffer solution.

* * * * *

UNITED STATES PATENT AND TRADEMARK OFFICE
CERTIFICATE OF CORRECTION

| | |
|---|---|
| PATENT NO. | : 11,059,043 B2 |
| APPLICATION NO. | : 15/491743 |
| DATED | : July 13, 2021 |
| INVENTOR(S) | : Tza-Huei Wang et al. |

It is certified that error appears in the above-identified patent and that said Letters Patent is hereby corrected as shown below:

On the Title Page

Please insert the following before item (65):
-- (60) Related U.S. Application Data
Provisional application No. 62/324,705, filed on Apr. 19, 2016. --

Signed and Sealed this
Fourth Day of July, 2023

Katherine Kelly Vidal
*Director of the United States Patent and Trademark Office*